(12) United States Patent
Gallet (10) Patent No.: US 8,444,388 B2
(45) Date of Patent: May 21, 2013

(54) SYSTEM OF COUNTER-ROTATING PROPELLERS WITH A FEATHERING DEVICE FOR PROPELLER BLADES

(75) Inventor: Francois Gallet, Paris (FR)

(73) Assignee: SNECMA, Paris (FR)

( * ) Notice: Subject to any disclaimer, the term of this patent is extended or adjusted under 35 U.S.C. 154(b) by 466 days.

(21) Appl. No.: 12/922,570

(22) PCT Filed: Mar. 20, 2009

(86) PCT No.: PCT/EP2009/053280
§ 371 (c)(1),
(2), (4) Date: Sep. 14, 2010

(87) PCT Pub. No.: WO2009/115593
PCT Pub. Date: Sep. 24, 2009

(65) Prior Publication Data
US 2011/0014046 A1    Jan. 20, 2011

(30) Foreign Application Priority Data
Mar. 21, 2008   (FR) ..................................... 08 51848

(51) Int. Cl.
*B63H 5/10*    (2006.01)
*B64C 11/48*   (2006.01)
*B64C 27/10*   (2006.01)

(52) U.S. Cl.
USPC ............ 416/127; 416/128; 416/155; 416/165

(58) Field of Classification Search
USPC ................. 416/124, 125, 127, 128, 129, 130, 416/147, 149, 159, 155, 163, 164, 165, 166
See application file for complete search history.

(56) References Cited

U.S. PATENT DOCUMENTS

| 2,761,517 A | | 9/1956 | Detamore et al. |
| 4,728,261 A | * | 3/1988 | Wright et al. ................. 416/127 |
| 5,137,425 A | * | 8/1992 | Rohra et al. .................. 416/129 |
| 6,077,040 A | * | 6/2000 | Pruden et al. ................... 416/45 |
| 6,981,844 B2 | * | 1/2006 | Perkinson et al. ................ 416/1 |

FOREIGN PATENT DOCUMENTS

| FR | 50 123 | 12/1939 |
| FR | 985 976 | 7/1951 |
| FR | 1 114 232 | 4/1956 |
| GB | 2 218 747 | 11/1989 |

* cited by examiner

*Primary Examiner* — Edward Look
*Assistant Examiner* — Maxime Adjagbe
(74) *Attorney, Agent, or Firm* — Oblon, Spivak, McClelland, Maier & Neustadt, L.L.P.

(57) ABSTRACT

A system of counter-rotating propellers for an aircraft turbine engine including a first and a second propeller, each including a stalling control system for the blades, a rotating actuating mechanism for sliding an element to move the angle of attack of the blades, and a disengaging mechanism for rigidly fixing in rotation the rotating actuating mechanism. The system is designed so that when the disengaging mechanism is engaged, a relative rotation speed is created between the elements and the associated rotating actuating mechanism thereof, bringing the blades into a neutral position thereof for feathering.

7 Claims, 4 Drawing Sheets

SYSTEM OF COUNTER-ROTATING PROPELLERS WITH A FEATHERING DEVICE FOR PROPELLER BLADES

TECHNICAL FIELD

The present invention relates, in a general way, to a system of counter-rotating propellers for turbine engine aircraft, and more particularly to a system of counter-rotating propellers with means of allowing the feathering of the blades of the two propellers.

The invention also relates to an aircraft turbine engine, comprising such a system of counter-rotating propellers.

PRIOR ART

In the prior art, turbine engines with a counter-rotating propeller system are known where the propellers are driven by rotors turning respectively in opposite directions of rotation. These propeller systems are generally designed to allow the feathering of the propeller blades, i.e. for stalling same so that they present the smallest possible angle of attack with respect to the axis of the associated turbine engine. In such a case, we talk about a position of minimum angle of attack, of a minimum angle position or of the neutral position.

The feathering of the propeller blades can be desired under various circumstances, such as namely, when the engine stops and it becomes crucial to decrease the drag generated by the stationary rotating blades as much as possible. In other circumstances, when one of the propellers undergoes a blade loss, the feathering of the blades of the two propellers is necessary to avoiding the rev up of the other propeller.

Moreover, the feathering of the blades is sought when wanting to cancel or decrease the thrust of the turbo engine as much as possible, since, despite the continuing rotation of the blades about the engine axis, the neutral position thereof only leads to a small thrust, or even a zero thrust.

The feathering can be achieved using classical control systems for stalling the blades, by piloting same so that the blades are moved into the position of minimum angle of attack thereof. However, in the case of failure of the control systems for stalling the blades, feathering is no longer possible, which is naturally unacceptable.

DISCLOSURE OF THE INVENTION

The scope of the invention is to remedy at least partially, the inconveniences mentioned above, relative to the embodiments of the prior art.

For this, the invention has firstly as subject matter, a system of counter-rotating propellers for turbine engine aircraft, comprising a first and a second propeller centered on a longitudinal axis, said first propeller comprising a first propeller rotor intended for turning in a first direction of rotation about the longitudinal axis with respect to a stator of the propeller system, and bearing first blades, said first propeller comprising, in addition, a first control system for stalling the first blades, allowing the displacement of the latter between a minimum angle of attack position and a maximum angle of attack position, said control system for stalling comprising a first element sliding along a longitudinal axis, matching said first blades so that the first displacement of same along a first direction of sliding, leads said first blades to come closer to the minimum angle of attack position thereof, and so that the displacement of same along a second direction of sliding opposite to the first, leads said first blades to come closer to the maximum angle of attack position thereof, said first sliding element being piloted by first rotating means of actuating, of which the rotational movement about the longitudinal axis induces a sliding movement of said first element about the same axis, said control system for stalling comprising, in addition, a first motor allowing the application of said rotational movement to said first rotating means of actuating, said first sliding element and first rotating means of actuating being driven into rotation by said first rotor in said first direction of rotation, with regard to the stator, said second propeller comprising a second propeller rotor intended for turning in a second direction of rotation about the longitudinal axis with respect to a stator of the propeller system, and bearing second blades, said second propeller comprising, in addition, a second control system for stalling the second blades, allowing the displacement of the latter between a minimum angle of attack position and a maximum angle of attack position, said control system for stalling comprising a second element sliding along a longitudinal axis, coupling said second blades so that the second displacement of same along a second direction of sliding leads said second blades to come closer to the minimum angle of attack position thereof, and so that the displacement of same along a second direction of sliding opposite the second, leads said second blades to come closer to the maximum angle of attack position thereof, said second sliding element being piloted by second rotating means of actuating, of which the rotational movement about the longitudinal axis induces a sliding movement of said second element about the same axis, said control system for stalling comprising, in addition, a second motor allowing the application of said rotational movement to said second rotating means of actuating, said second sliding element and second rotating means of actuating being driven into rotation by said second rotor in said second direction of rotation, with regard to the stator.

According to the invention, said system of counter-rotating propellers also comprises means of disengaging ("a clutch") for rigidly fixing during rotation, said first and second rotating means of actuation, said system of propellers being designed so that when the means of disengaging are engaged, two relative speeds of rotation are respectively created between said first sliding element, driven into rotation by said first rotor, and the associated first rotating means of actuating of same, and between said second sliding element, driven into rotation by said second rotor, and the associated second rotating means of actuating, leading each the first and second sliding elements to move respectively in said first sliding direction and said third sliding direction, bringing said first and second blades into the minimal position thereof.

The invention, simple to implement and not expensive, is a clever solution for obtaining a reliable and rapid feathering of the blades of the two propellers.

The invention is therefore supported by the use of means of disengaging for rigidly fixing in rotation the first and second rotating means of actuating, while the means of disengaging of coupling during rotation require only little energy, and easily integrate into the classical architecture of the systems of counter-rotating propellers.

With the system according to the invention, as long as the means of disengaging stay disengaged, the first and second rotating means of actuating rotate with the respective rotors thereof, and therefore, in opposite directions, each in the same direction and with a rotation speed that is identical to the rotation speed of the rotor and of the associated sliding element thereof. However, when the means of disengaging are engaged following a command to feather the blades, the first and second rotating means of actuating become coupled during rotation, so that same adopt the same rotation speed and the same direction of rotation.

In a first case, the most natural, the rotation speed of the first and second rotating means of actuating tends towards the same algebraic mean of the speeds of rotation of the rotors, i.e. the speed becomes zero. It is, however, possible that in a second case, the speed of the two rotating means of actuating tends towards a non-zero speed, implying that these two means are driven more by one rotor than by the other rotor. However, in this latter case, the speed of the two rotating means of actuating will stay lower than the rotation speeds of the rotors and of the sliding elements driven by the rotors.

Whatever the case, in both considered cases, it is the relative rotation speed created between the rotating means of actuating, mutually slowed down by the coupling thereof, and the associated sliding elements, always driven at the speed of the rotors, which enables the moving of the sliding elements to be automatically obtained in determined directions, leading to the feathering of the blades of the two propellers.

It should be noted that the second case indicated above is differentiated from the first case in the sense that the feathering of the blades of the propeller, which sees the rotating means of actuating thereof rotate in a direction opposite to the direction of the associated rotor, takes place more rapidly than the feathering of the blades of the blades of the other propeller which sees the rotating means of actuating thereof rotating in the same direction as the direction of the associated rotor, but with a lower speed because of the deceleration driven by the other blade, via the means of disengaging.

Moreover, it is indicated that the system of counter-rotating propellers is preferably designed so that when the sliding elements arrive at the end of travel in the translation movement thereof with respect to the associated rotating means of actuating, positioning the blades of same in the neutral position, the stops established at the end of travel prevent same from continuing to slide along the rotating means of actuating, despite the application of the differential speed of rotation between these elements. Thus, this generates a blockage, leading the sliding elements to be become rigidly fixed in rotation to the associated rotating means of actuating. For information only, it is noted that these stops can be flexible, so as to minimize the shocks produced by the encounters between the sliding elements and the associated stops.

Once the sliding elements are on the stops, the rotating means of actuating are driven into rotation with the rotors, and since same engage one with the other, the clutch plays the role of a disc brake. Thus, it can be seen that the simple actuating of the means of disengaging leads successively and automatically to the feathering of the blades, and to the arrest in rotation of the propellers.

This arrest in rotation of the propellers also occurs, but sequentially, when the first and second rotating means of actuating continue to rotate at a reduced speed, following the actuating of the means of disengaging. Indeed, in the above-mentioned case where one of the propellers sees the rotating means of actuating thereof turning in a direction opposite to the direction of the associated rotor, the stop at the end of travel of the sliding element associated with this propeller is encountered prior to the stop encountered on the other propeller. Thus, the first propeller is feathered before the second propeller, and the rotating means of same are blocked during rotation with respect to the rotor thereof. While the two rotating means of actuating are engaged, same rotate together with respect to the second rotor, and thus the rotating means of the second rotor rotate with respect to the second rotor, feathering the second propeller because of this. As previously mentioned, this generates a blockage, also leading to the arrest in rotation of the sliding element, as well as the arrest of the rotor coupled in rotation with the same element.

Preferably, each of said first and second rotating means of actuating is constituted by a ballscrew.

Preferably, said means of disengaging rigidly fixing in rotation said first and second rotating means of actuating, are constituted by a sliding disk clutch system, preferably controlled by a motor carried on one of the first and second rotating means of actuating.

Also preferentially, each of the first and second sliding elements is constituted by a sliding cone matching an eccentric pin of each blade associated with the cone.

Preferentially, said first and third sliding directions are identical, and said second and fourth sliding directions are identical. Naturally, it would have been possible to anticipate the inverse situation, without going beyond the frame of the invention.

Moreover, the subject matter of the invention is an aircraft turbine engine comprising a system of counter-rotating propellers as described above, while the turbine engine is, preferably, a turbo-propeller, but can alternatively be a turbo-jet engine. Naturally, in the latter case, the system of propellers is intended to constitute the fan of the turbo-jet engine.

In addition, whatever the type of turbine engine concerned, the system of propellers is preferably designed so that the propellers lack an external radial shroud surrounding the propellers, the system being then called "Open Rotor".

Finally, the subject matter of the invention is also a method for piloting a system of counter-rotating propellers for an aircraft turbine engine such as described above. With this method, when stalling in the minimum angle of attack of the first and second blades is required, in other words a feathering of these blades, said means of disengaging that allow said first and second rotating means of actuating to be rigidly fixed in rotation, are controlled so as to engage.

Other advantages and features of the invention will appear in the non-limiting description below.

BRIEF DESCRIPTION OF THE DRAWINGS

These description will be made with regard to the appended drawings among which.

DETAILED DESCRIPTION OF THE PREFERRED EMBODIMENTS

Figure 1:
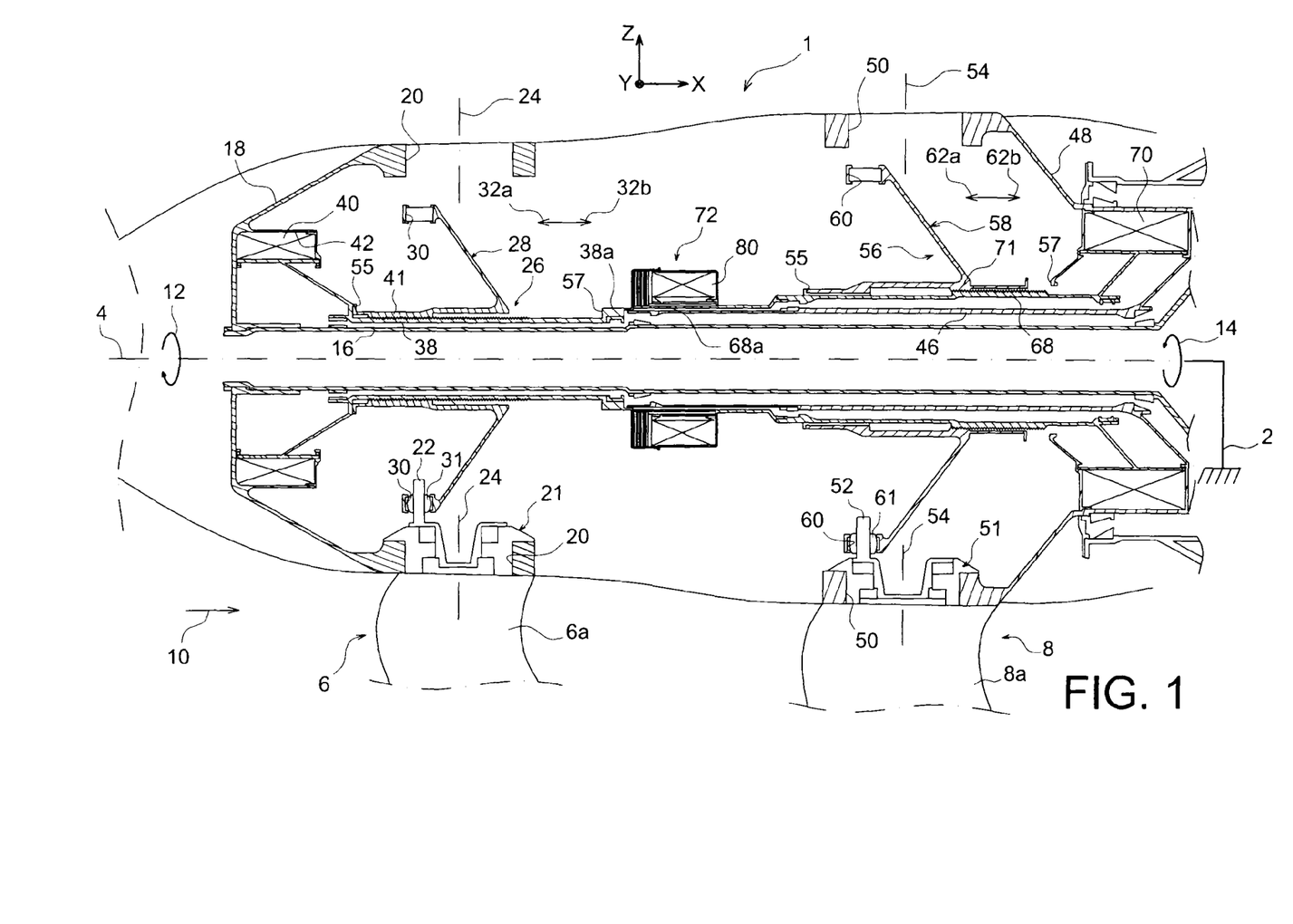
FIG. 1 shows a longitudinal cross-section view of a counter-rotating propeller system for an aircraft turbine engine, according to a preferred embodiment of the present invention.

With reference to FIG. 1, a part of the system of counter-rotating propellers 1 for an aircraft turbine engine can be seen, according to a preferred embodiment of the present invention.

The X axis corresponds to the longitudinal direction of the propeller system 1, a direction which also corresponds to the longitudinal direction of the turbine engine intended to integrate such a propeller system 1. The Y axis corresponds to the transverse direction of the propeller system 1, and the Z axis to the vertical direction or to the height, these three axes being mutually orthogonal.

The propeller system 1 comprises a stator or a casing 2 (only schematically shown), centered on a longitudinal axis 4 of the system, parallel to the X axis. This stator is intended to be rigidly attached in a known way to the other casings of the turbine engine. In this respect, it is indicated that the propeller system 1 is preferably designed so that the propellers lack an external radial shroud surrounding the propellers, namely of the "Open Rotor" type, as visible in FIG. 1.

In addition, the system of counter-rotating propellers 1 integrates a first propeller 6 or upstream propeller, bearing the blades 6*a*. In an analogous manner, the system 1 comprises a second propeller 8 or downstream propeller, bearing the blades 8*a*. Thus, propellers 6, 8 are displaced one from the other along a main direction of flow for the air through the system 1, schematically shown by the arrow 10 parallel to the X axis, the main direction of flow also being the reference for the terms "upstream" and "downstream" used below. The two propellers 6, 8 intended to rotate in opposite directions about the axis 4 on which same are centered, while the rotations take place with respect to the stator 2 which stays immobile. The propeller 6 turns in a first direction of rotation 12 which can be clockwise in a front view, and the propeller 8 turns in a second direction of rotation 14, opposite to the first direction, which can be anti-clockwise in a front view, even if the inverse situation could be adopted, without going beyond the frame of the invention.

In all of the description, it is noted that the notion of "speed of rotation" of a given element corresponds to the speed of rotation of same with respect to the immobile stator 2, along the longitudinal axis 4, unless the axis is positioned otherwise.

Firstly, as far as the first propeller 6 is concerned, the propeller comprises a driving shaft 16 centered on the axis 4, and intended to be driven in rotation by a mechanical transmission device (not shown), e.g. forming a reductor with an epicyclic train, the train being driven by the turbine of the turbine engine.

This hollow shaft 16 bears, fixed to the upstream end thereof, a first rotor 18 rotating, therefore, in the first direction 12, this same rotor housing, at the level of the external radial end thereof, namely at the level of the circumferential crown thereof, said first propeller blades 6*a*. For this, the orifices 20 are made in the rotor 18 centered on the axis 4 for housing the foot 21 of the blades 6*a*, each of the latter two having a pin 22 eccentric with respect to the main axis 24 of the blade, preferably corresponding to a radial axis of the propeller system 1.

It is noted that the rotor 18 also roughly takes the shape of a truncated cone coming from the upstream end of the driving shaft 16, and opening towards the downstream.

It is known that the eccentric pins 22 which protrude radially towards the inside, belong to a first system of stalling control 26 for the first blades, allowing the latter to be shifted between the position of minimal angle of attack and the position of maximum angle of attack with respect to the axis 4. The shift of each blade 6*a* between these two positions is produced by pivoting of the blade about itself, i.e. about the main axis 24 thereof, which also corresponds to the axis of the associated orifice 20.

For this, the system of stalling control 26 comprises a first sliding element, e.g. of the type of the control cone 28 centered on the axis 4, and capable of sliding along the same axis with respect to the stator.

This control cone 28, e.g. opening towards the upstream, has at the level of the downstream end thereof, with the largest diameter, a plurality of orifices 30 for housing the eccentric pins 22 of the first blades. As is also known by a person skilled in the art, the shift of the cone 28 according to a first direction of sliding 32*a*, namely towards the axis 4, leads the first blades 6*a* to come closer to the minimum angle of attack position thereof, also called minimum angle position or neutral position, sought for the feathering of the propeller 6. As previously mentioned, the rotation of the blades 6*a* inside the orifices 20 thereof, with respect to the axis of same 24, towards the neutral position thereof shown in FIG. 1, takes place in response to the translational pressing of the cone 28 on the eccentric pins 22 that the cone bears. In FIG. 1, the cone 28 is indeed shown at the end of travel position thereof, in the first direction of sliding 32*a*, where the cone allows the blades 6*a* to adopt the neutral position thereof which ensures the feathering of the propeller. However, the system 1 could alternatively be designed so that the neutral position of the blades 6*a* can be obtained with the cone positioned at the end of travel in the second direction of sliding 32*b* opposite to the first direction 32*a*, without going beyond the frame of the invention.

In reference still to FIG. 1, as described above, the displacement of the cone along the second direction of sliding 32*b*, namely towards the downstream according to axis 4, leads the first blades 6*a* to come closer to the maximum angle of attack position thereof, sought for achieving maximum thrust. Here again, the rotation of the blades 6*a* according to the axis 24 of same, towards the maximum angle of attack position thereof, takes place in response to the translational pressing of the cone 28, on the eccentric pins 22 that same bears.

It is noted that, due to the housing of the eccentric pins 22 in the orifices 30 of the cone, possibly by intermediary of ball-joints 31, the shaft 16, the rotor 18 and the blades 6*a* jointly form an assembly which is rigidly fixed in rotation with respect to the axis 4. For information only, the displacement of the pins 22 and of the cone 28 can take the form of a combination between a translation along the axis 4 and a rotation about this axis. Still for information only, it is possible to circumvent this double movement by introducing a ring between the eccentric pins at the foot of the blade, and the same cone. The specified movement of rotation takes place between the ring and the cone, therefore implying that the latter only moves in axial translation.

In order to ensure the translation of the control cone according to the directions 32*a* and 32*b*, the stalling control system 26 is equipped with a first rotating means of actuating, e.g. of the ballscrew type 38, centered on the axis 4. This screw 38 is classically conceived to transform the rotational movement about the axis 4 into a sliding movement of the cone 28 along the same axis 4, like an endless screw.

The screw 38 is situated around the shaft 16, and is surrounded by the control cone 28, of which the substantially cylindrical interior portion 41 matches the external thread of the screw 38, staying permanently fixed in translation with respect to the rotor 18 and the stator. In this respect, it is noted that the cone 28 is the only element, of the specified elements of the propeller 6, which can be moved in translation along the axis 4 with respect to the stator, the other elements staying mutually fixed in translation, and with respect to the same stator.

The upstream end of the ballscrew 38 couples with the first motor 40 to apply the rotational movement to this same screw, in order to move the cone 28 in translation. Indeed, it is e.g. anticipated that the motor 40 is provided with a stator fixed onto the rotor 18 of the propeller 6, e.g. in an annular base of the rotor 18, and is also provided with a rotor fixed onto the upstream end of the screw 38. Therefore, when the motor 40 is at rest, the screw 38 is driven in rotation about the axis 4 by the rotor of the propeller, and therefore in the same direction and with the same speed as the specified assembly rigidly fixed in rotation, comprising the shaft 16, the rotor 18, the blades 6*a* and the cone 28. This immobility in rotation of the screw 38 and of the specified assembly is then a consequence of the fixed rotation of the rotor 18 and the stator of the motor 40.

On the other hand, when the motor 40 is actuated, the rotation speed of the screw 38 becomes different from that of the cone 28 still fixed in rotation to the rotor 18, from which results the creation of a relative rotation speed between these two elements, leading to the desired sliding along one of the two directions 32*a*, 32*b* of the cone 28 along the screw 18 which stays immobile in translation with respect to the stator. Therefore, in this way, namely by piloting the motor 40, it is possible to control the stalling of the blades 6*a*, between the minimum angle of attack position and the maximum angle of attack position thereof.

As for the second propeller 8 located more downstream with a design substantially similar to the design of the propeller 6, same comprises a driving shaft 46 centered on the axis 4, and e.g. located around the driving shaft 16 which crosses same. It is also intended for being driven into rotation by the mechanical transmission device driven by the turbine of the turbine engine.

This hollow shaft 46 bears, fixed to the downstream end thereof, a second rotating rotor 48, therefore in the second direction 14, this same rotor housing said second propeller blades 8*a*, at the level of the external radial end thereof, namely at the level of the circumferential crown thereof. For this, orifices 50 are made in the rotor 48 centered on the axis 4 to house the foot 51 of the blades 8*a*, each of the latter having an pin 52 eccentric with respect to the main axis 54 of the blade, preferably corresponding to a radial axis of the propeller system 1.

It is noted that the rotor 48 also roughly takes the shape of a truncated cone coming from the downstream end of the driving shaft 46, and opening towards the upstream.

The eccentric pins 52 which protrude radially towards the inside, belong to a first system of stalling control 56 for the second blades, enabling the displacement of the latter to be carried out between the position of minimal angle of attack and the position of maximum angle of attack with respect to the axis 4. The displacement of each blade 8*a* between these two positions is also produced by pivoting the blade about itself in the orifice 50 thereof, i.e. about the main axis 54 thereof, which also corresponds to the axis of this orifice.

For this, the system of stalling control 56 comprises a first sliding element, e.g. of the type of the control cone 58 centered on the axis 4, and capable of sliding along the same axis.

This control cone 58, e.g. opening towards the upstream, has at the level of the upstream end thereof, with the largest diameter, a plurality of orifices 60 for housing the eccentric pins 52 of the second blades. As is also known by a person skilled in the art, the displacement of the cone 58 according to a third direction of sliding 62*a* identical to the first 32*a*, namely towards the upstream along the axis 4, leads the second blades 8*a* to come closer to the neutral position thereof, sought for feathering the propeller 8. As previously mentioned, the rotation of the blades 8*a* about the axis of same 54, towards the neutral position thereof shown in FIG. 1, takes place in response to the translational pressing of the cone on the eccentric pins 52 that the cone bears. In FIG. 1, the cone 58 is indeed shown at the end of travel thereof in the third direction of sliding 62*a*, where the cone allows the blades 8*a* to adopt the neutral position thereof which ensures the feathering of the propeller. However, the system 1 could here also alternatively be designed so that the neutral position of the blades 8*a* can be obtained with the cone 58 positioned at the end of travel in the fourth direction of sliding 62*b* opposite to the third direction 62*a*, without going beyond the frame of the invention.

In reference still to FIG. 1, as described above, the displacement of the cone 58 along the fourth direction 62*b*, identical to the specified sliding direction 32*b*, namely towards the upstream according to axis 4, leads the second blades 8*a* to come closer to the maximum angle of attack position thereof, sought for achieving maximum thrust. Here again, the rotation of the blades 8*a* according to the axis 54 of same, towards the maximum angle of attack position thereof, takes place in response to the translational pressing of the cone 58, on the eccentric pins 52 that same bears.

It is noted that, due to the housing of the eccentric pins 52 in the orifices 60 of the cone, possibly by intermediary of the balljoints 61, the shaft 46, the rotor 48 and the blades 8*a* jointly form an assembly which is rigidly fixed in rotation with respect to the axis 4. Here also, the displacement of the pins 52 and of the cone 58 can take the form of a combination between a translation along the axis 4 and a rotation about this axis. Still for information only, it is possible to circumvent this double movement by introducing a ring between the eccentric pins at the foot of the blade, and the same cone. The specified movement of rotation takes place between the ring and the cone, therefore implying that the latter only moves by axial translation.

In order to ensure the translation of the control cone 58 according to the directions 62*a* and 62*b*, the stalling control system 56 is equipped with second rotating means of actuating, e.g. also of the ballscrew type 68, centered on the axis 4. This screw 68 is classically conceived to transform the rotational movement about the axis 4 into a movement of sliding of the cone 58 along the same axis 4, like an endless screw.

The screw 68 is located around the shaft 46, and is surrounded by the control cone 58, of which the substantially cylindrical interior portion 70 couples with the external thread of the screw 68, staying permanently fixed in translation with respect to the rotor 48 and the stator. In this respect, it is noted that the cone 58 is the only element of the specified elements of the propeller 8, which can be moved in translation along the axis 4 with respect to the stator, the other elements staying mutually fixed in translation, and with respect to the same stator.

The downstream end of the ballscrew 68 couples with the second motor 70 to apply the rotational movement to this same screw, in order to move the cone 58 in translation. Indeed, it is e.g. anticipated that the motor 70 is provided with a stator fixed onto the rotor 48 of the propeller 8, e.g. in an annular base of the rotor 48, and is also provided with a rotor fixed onto the downstream end of the screw 68. Therefore, when the motor 70 is at rest, the screw 68 is driven into rotation about the axis 4 by the rotor of the propeller, and therefore in the same direction and with the same speed as the specified assembly rigidly fixed in rotation, comprising the shaft 46, the rotor 48, the blades 8*a* and the cone 58. This immobility in rotation of the screw 68 and of the specified assembly is then a consequence of the arrest of rotation between the rotor 48 and the stator of the motor 70.

On the other hand, when the motor 70 is actuated, the rotation speed of the screw 68 becomes different from that of the cone 58 still fixed in rotation to the rotor 48, from which results the creation of a relative rotation speed between these two elements, leading to the desired sliding along one of the two directions 62a, 62b of the cone 58 along the screw 68 which stays immobile in translation with respect to the stator. Therefore, in this way, namely by piloting the motor 70, it is possible to control the stalling of the second blades 8a, between the minimum angle of attack position and the maximum angle of attack position thereof, and this independently of the stalling of the first blades 6a.

One of the particularities of the present invention resides in the implementation of the means of disengaging, reference 72, allowing the two ballscrews 38, 68 to become rigidly fixed in rotation, the downstream end 38a of the first ballscrew being located in proximity to the upstream end of the second ballscrew, as visible in FIG. 1. More precisely, as will be detailed in reference to FIG. 3, the two ends mutually match to form the means of disengaging 72.

Globally, the propeller system 1 is designed so that, when the means of disengaging 72 are engaged, a mutual slowing down is created between the rotating means, one with respect to the other, and therefore a relative rotation speed is created on the one hand between the cone 28 driven into rotation by the first rotor 18, and the slowed down screw 38 and on the other hand between the cone 58 driven into rotation by the second rotor 48, and the slowed down screw 68, coupled to the screw 38. These relative rotation speeds lead each of the cones 28, 58 to move respectively in the first direction 32a and the third direction 62a, bringing the blades 6a, 8a into the neutral position thereof which ensures the feathering.

Figure 2A:
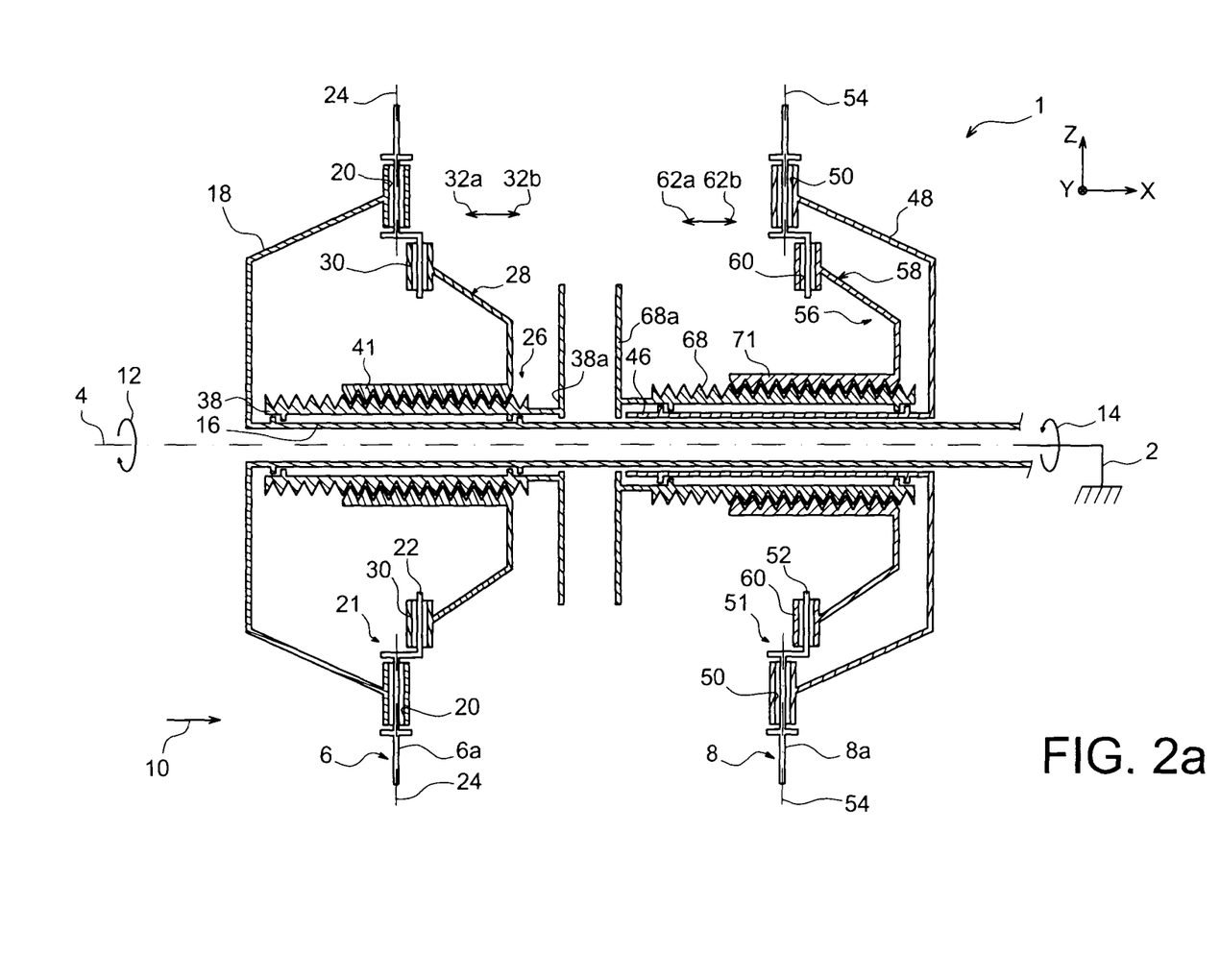
FIGS. 2a and 2b show schematic longitudinal cross section views of a part of the system of counter-rotating propellers shown in FIG. 1, explaining the operation of the system for feathering the propeller blades.

In reference to FIG. 2a, the propeller system 1 can be seen schematically in a configuration such as adopted during normal operation, i.e. as long as no order for feathering the propellers has been given.

As previously mentioned, as long as no stalling modification has been ordered, and as long as the means of disengaging stay disengaged, the screws 38 and 68 rotate in opposite directions 12, 14, each in the same direction and at a speed identical to the speed of the associated rotors 18, 48 thereof and of the cones 28, 58 thereof, due to the driving into rotation of same about the axis 4 by the same rotors 18, 48. During the normal operation of the turbine engine, the motors 40, 70 can be independently actuated in order to place the blades 6a, 8a in the desired stalling positions.

When the means of disengaging are engaged following a feathering command for the blades, the screws 38, 68 one rubbing on the other, entrain one to the other, and finish by becoming rapidly coupled in rotation, implying that same automatically adopt the same rotation speed and the same rotation direction.

In a first case, where the mutual friction of the screws 36, 68 leads to kinematic equilibrium between these two screws, this rotation speed becomes zero. In a second case, these two influences do not result in kinematic equilibrium between the screws, and therefore the rotation speed is non-zero for the two screws 38, 68. This speed stays lower than the rotation speeds of the rotors 18, 48 and of the control cones 28, 58 driven by these rotors.

For these two cases where the two screws are coupled in rotation, it is the relative rotation speed with respect to the axis 4, which is created between the screws 38, 68 and the associated cones 28, 58 thereof, always driven at the speed of the rotors, which allows the cones 28, 58 to be automatically, rapidly and reliably moved, leading to a feathering of the blades of the two propellers.

Figure 2B:
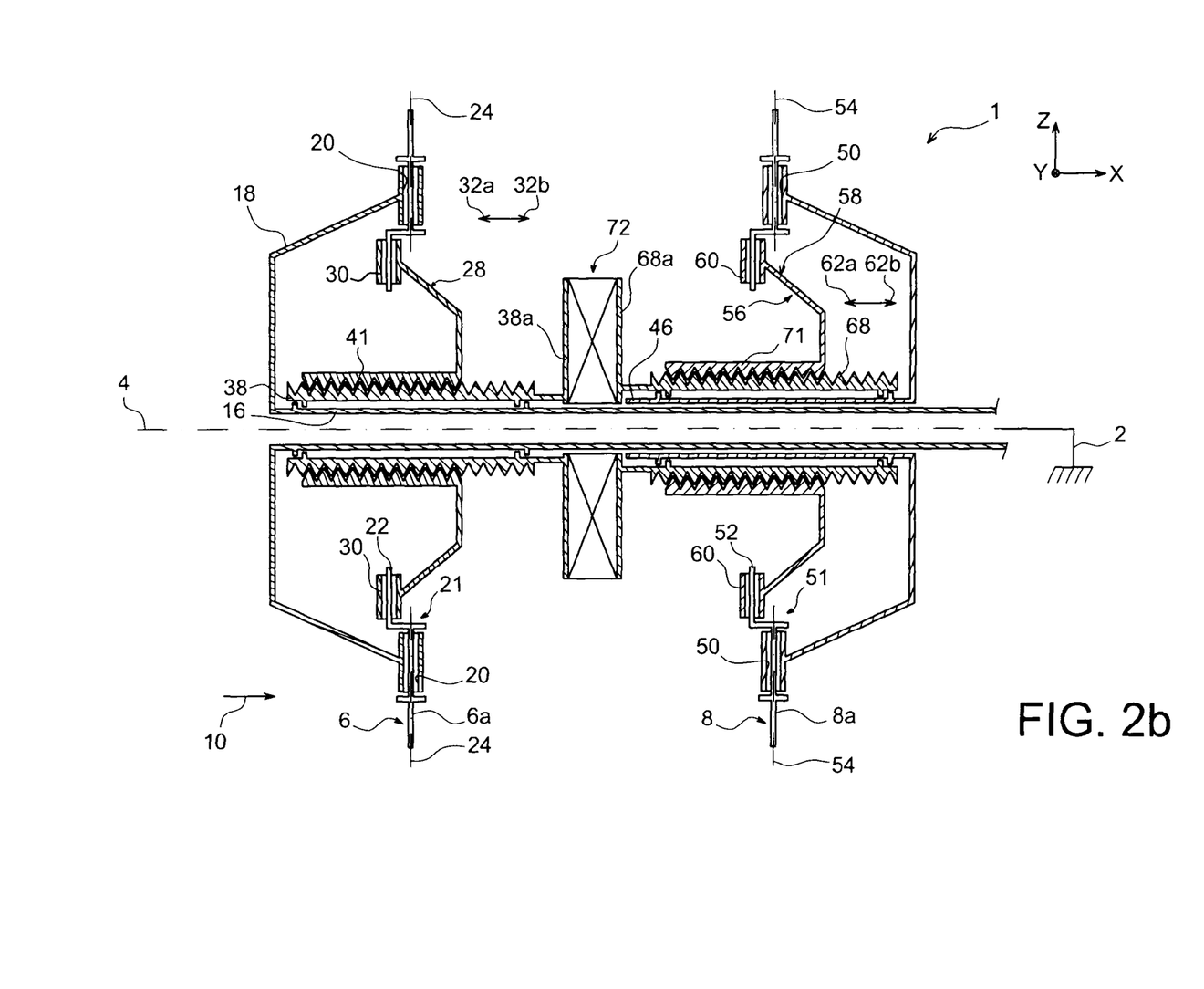

The system of counter-rotating propellers 1 is also designed so that, when the cones 28, 58 arrive at the end of travel in the translation movement thereof with respect to the screws 38, 68, placing the blades 6a, 8a in the neutral position such as shown in FIG. 2b, the stops established at the end of travel prevent same from continuing to slide along the screws. These stops can be, e.g. constituted by the contact between the orifices 30, 60 of the cones 28, 58 and the associated eccentric pins of same 22, 52, when the latter cannot be moved further towards the upstream. This then generates a blockage, leading the cones 28, to become rigidly attached in rotation to the associated screws thereof. In this respect, even more preferentially and such as schematized by the references 55 in FIG. 1, a plane-to-plane contact can be foreseen at the end of travel, between each cone and the associated screw thereof. Of course, stops of the type 57 can also be provided to arrest the travel in the direction of movement opposite to the cones 28, 58.

In the first case where the screws 38, 68 stop in rotation with respect to the rotors 18 and 48 respectively, following the actuating of the means of disengaging 72, the cones reach at the same time the ends of travel for translation thereof. The blades are thus feathered, and, as a result of the arrest of same in rotation with respect to the rotors thereof, the ballscrews are respectively driven into rotation by the same rotors, the engagement plays the role of a disk brake, which tends to stop the rotation of the propellers. Therefore, the simple actuating of the means of disengaging 72 automatically leads to the feathering of the blades, and then to the arrest of the rotation of the propellers 6 and 8.

In the above-mentioned second case where the screws 38, 68 continue to rotate at a reduced speed with respect to the stator following the actuating of the means of disengaging 72, e.g. in the rotation direction 14, the end of travel stop of the cone 28 is met prior to the stop met for the cone 58. Thus, cone 28 and the associated screw 38 thereof are blocked becoming rigidly fixed in rotation with the rotor 18 at the moment when the cone 28 arrives at the end of travel as shown in FIG. 2b. Thus, the screw 68 rotates with the rotor 18, which accelerates the translation displacement of cone 58 along the third direction 62a, which reaches therefore more rapidly the end of travel position thereof shown in FIG. 2b. When cone 58 reaches its own end of travel, the blade is feathered and the screw 68 tends to be driven into rotation with the rotor 48. Thus, as the rotors 18 and 48 rotate in opposite directions and as the screws 38 and 68 are rigidly fixed in rotation (effect of the stop), the engagement behaves like a disk brake, which slows down the two rotors 18 and 48.

Figure 3:
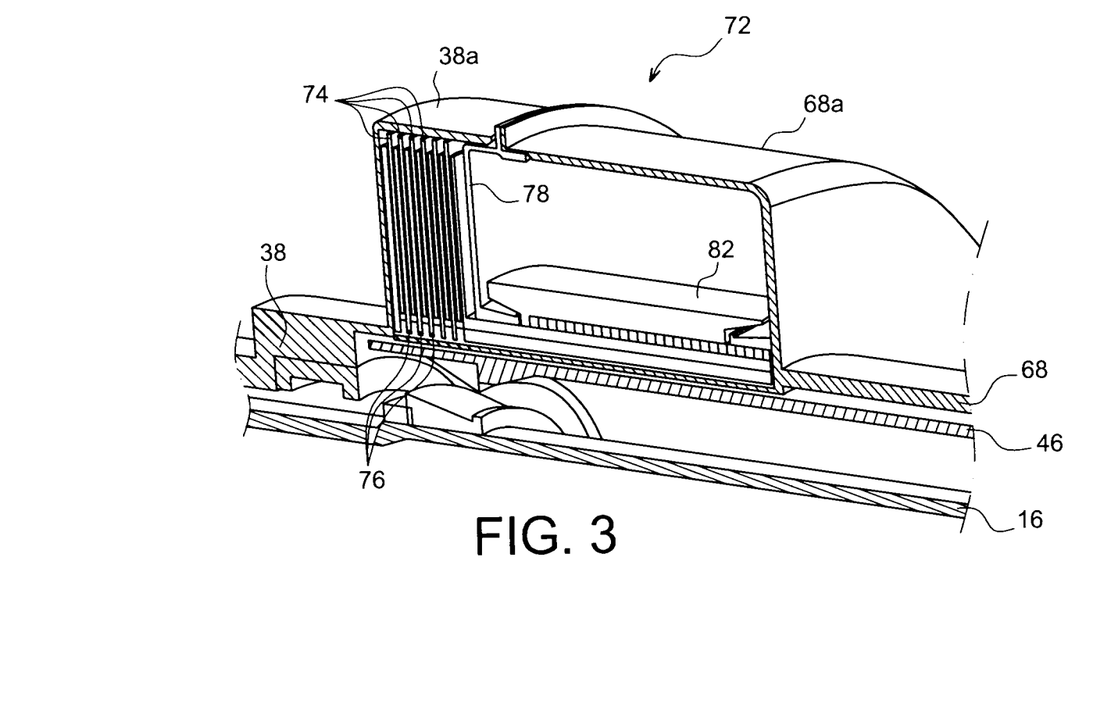
FIG. 3 shows an enlarged perspective view showing the means of disengaging for rigidly fixing in rotation, a part of each of the two propellers of the system shown in the previous figures.

In reference now to FIG. 3, an example of an embodiment for the means of disengaging 72 can be seen, which integrates the downstream end 38a of the first screw 38 and the upstream end 68a of the second screw 68, these two ends being located in proximity to each other.

Globally, the means 72 are constituted of a clutch system with sliding disks. More specifically, two sets of disks 74, 76 are provided, the first set of disks 74 which are orthogonal to the axis 4 have a sliding link with the screw 38, and the second set of disks 76 which are also orthogonal to the axis 4 have a sliding link with the screw 68.

At rest, these disks 74, 76 are sufficiently distanced so as not to rub against each other, so that the screws 38, 68 can rotate in opposite directions about the same axis, without the presence of the clutch system 72 causing any hindrance.

On the other hand, following the reception of a command for feathering the blades, it is foreseen that the disks 74, 76 are put into contact to establish the coupling in rotation of the two ends 38a, 68a.

For this, a piston 78 is provided inside the upstream end 68a, which is capable of displacement along the axis 4 with respect to the same end, in order to press the disks 74, 76 one against the other, and therefore compress the two sets. This translational displacement of the piston 78 is ensured by the motor (schematically shown in FIG. 1 and removed from FIG. 3), located inside the upstream end 68a. Preferably, it is a rotating motor with a fixed stator on the upstream end 68a, and a rotor 82 matching a threaded portion of the piston 78. The rotation of the rotor 82 which is fixed in translation with respect to the upstream end 68a is then converted into a translational displacement of the piston 82 along the axis 4, with respect to the same end 68a.

Alternatively, an alternative solution can be considered for the means of disengaging 72, comprising springs with shape memory, the expansion of which would press on the piston to create the engagement effect.

Of course, various modifications to the described invention can be brought by a person skilled in the art, only as non limiting examples.

The invention claimed is:

1. A system of counter-rotating propellers for aircraft turbine engine, comprising:
   a first and second propeller centered on a longitudinal axis,
   the first propeller comprising a first propeller rotor configured to turn in a first direction of rotation about the longitudinal axis with respect to a stator of the propeller system, and bearing first blades, the first propeller comprising, in addition, a first stalling control system for the first blades, allowing displacement of the first blades between a minimum angle of attack position and a maximum angle of attack position, the stalling control system comprising a first element sliding along a longitudinal axis, coupling the first blades so that the first displacement of same along a first direction of sliding leads the first blades to come closer to the minimum angle of attack position thereof, and so that the displacement of same along a second direction of sliding opposite to the first, leads the first blades to come closer to the maximum angle of attack position thereof, the first sliding element being piloted by first rotating means of actuating, of which a rotating movement about the longitudinal axis induces a sliding movement of the first element about the same axis, the stalling control system comprising, in addition, a first motor allowing for application of the rotating movement to the first rotating means of actuating, the first sliding element and first rotating means of actuating being driven into rotation by the first rotor in the first direction of rotation, with regard to the stator,
   the second propeller comprising a second propeller rotor configured to turn in a second direction of rotation opposite to the first direction, about the longitudinal axis with respect to a stator of the propeller system, and bearing second blades, the second propeller comprising, in addition, a second stalling control system for the second blades, allowing displacement of the second blades between a minimum angle of attack position and a maximum angle of attack position, the stalling control system comprising a second element sliding along a longitudinal axis, coupling the second blades so that the displacement of same along a third direction of sliding leads the second blades to come closer to the minimum angle of attack position thereof, and so that the displacement of same along a fourth direction of sliding opposite to the third, leads the second blades to come closer to the maximum angle of attack position thereof, the second sliding element being piloted by second rotating means of actuating, of which a rotating movement about the longitudinal axis induces a sliding movement of the second element about the same axis, the stalling control system comprising, in addition, a second motor allowing application of the rotating movement to the second rotating means of actuating, the second sliding element and second rotating means of actuating being driven into rotation by the second rotor in the second direction of rotation, with regard to the stator;
   further comprising means of disengaging for rigidly fixing in rotation the first and second rotating means of actuation, the system of propellers configured so that when the means of disengaging are engaged, two relative speeds of rotation are respectively created between the first sliding element, driven into rotation by the first rotor, and the associated first rotating means of actuating of same, and between the second sliding element, driven into rotation by the second rotor, and the associated second rotating means of actuating, leading each of the first and second sliding elements to move respectively in the first sliding direction and the third sliding direction, bringing the first and second blades into the minimal angle of attack position thereof.

2. A system of counter-rotating propellers according to claim 1, wherein each of the first and second rotating means of actuating includes a ballscrew.

3. A system of counter-rotating propellers according to claim 1, wherein the means of disengaging that enable the first and second rotating means of actuating to become rigidly fixed in rotation, includes a clutch system with sliding disks.

4. A system of counter-rotating propellers according to claim 1, wherein each of the first and second sliding elements includes a sliding cone matching an eccentric pin of each of the blades associated thereof.

5. A system of counter-rotating propellers according to claim 1, wherein the first and third sliding directions are identical, and the second and fourth sliding directions are identical.

6. An aircraft turbine engine comprising a system of counter-rotating propellers according to claim 1.

7. A method for piloting a system of counter-rotating propellers for an aircraft turbine engine according to claim 1, wherein when a stalling in minimum angle of attack is required for the first and second blades, the means of disengaging that enable the first and second rotating means of actuating to become rigidly fixed in rotation, are operated for engagement.

* * * * *

UNITED STATES PATENT AND TRADEMARK OFFICE
CERTIFICATE OF CORRECTION

| | | |
|---|---|---|
| PATENT NO. | : 8,444,388 B2 | Page 1 of 1 |
| APPLICATION NO. | : 12/922570 | |
| DATED | : May 21, 2013 | |
| INVENTOR(S) | : Francois Gallet | |

It is certified that error appears in the above-identified patent and that said Letters Patent is hereby corrected as shown below:

In he Specification:

Column 6, line 20, change "the cone positioned" to --the cone 28 positioned--;

Column 7, line 67, change "cone on the eccentric" to --cone 58 on the eccentric--;

Column 10, line 8, change "cones 28, to become" to --cones 28, 58 to become--; and Column 11, line 3, change "motor (schematically" to --motor 80 (schematically--.

Signed and Sealed this
Tenth Day of September, 2013

Teresa Stanek Rea
*Acting Director of the United States Patent and Trademark Office*